(12) United States Patent
Zhang et al.

(10) Patent No.: US 12,436,666 B2
(45) Date of Patent: Oct. 7, 2025

(54) AUDIO/VIDEO PROCESSING METHOD AND APPARATUS, DEVICE AND STORAGE MEDIUM FOR SWITCHING BETWEEN AUDIO AND VIDEO PLAYING MODES AND ACQUIRING AUDIO PLAYLIST BASED ON VIDEO BELONGING TO A USER

(71) Applicant: Beijing Zitiao Network Technology Co., Ltd., Beijing (CN)

(72) Inventors: Wenshu Zhang, Beijing (CN); Xingge Li, Beijing (CN); Wentao Ruan, Beijing (CN); Huayun Miao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/882,623

(22) Filed: Sep. 11, 2024

(65) Prior Publication Data

US 2025/0004614 A1    Jan. 2, 2025

Related U.S. Application Data

(63) Continuation of application No. PCT/CN2023/080329, filed on Mar. 8, 2023.

(30) Foreign Application Priority Data

Mar. 11, 2022   (CN) .......................... 202210238660.8

(51) Int. Cl.
  *G06F 3/0483*   (2013.01)
  *G06F 3/0484*   (2022.01)

(52) U.S. Cl.
  CPC .......... *G06F 3/0483* (2013.01); *G06F 3/0484* (2013.01)

(58) Field of Classification Search
  None
  See application file for complete search history.

(56) References Cited

U.S. PATENT DOCUMENTS 8,868,481 B2 *  10/2014   Wei .................. H04N 21/26258
                                                                706/54
9,286,287 B1 *   3/2016   Tierney .................. G06F 40/242
(Continued)

FOREIGN PATENT DOCUMENTS

CN    105979355 A    9/2016
CN    106534983 A    3/2017
(Continued)

OTHER PUBLICATIONS

"How to listen video in Bilibili", Jingyan, 2022, 6 pages.
(Continued)

*Primary Examiner* — Gabriel Mercado
(74) *Attorney, Agent, or Firm* — Astute IP Law Group

(57) ABSTRACT

The present disclosure provides an audio/video processing method and apparatus, a device and a storage medium. The method includes: first, in response to a preset trigger operation acting on a video playback page corresponding to a target video, obtaining an audio corresponding to the target video, wherein the target video is a video in a video information flow; and then switching from the video playback page to an audio playback page, and playing back the audio corresponding to the target video on the audio playback page.

19 Claims, 9 Drawing Sheets

(56) References Cited

U.S. PATENT DOCUMENTS

| | | | |
|---|---|---|---|
| 9,584,591 B1* | 2/2017 | Weel | G08C 17/02 |
| 11,423,214 B2* | 8/2022 | Pasko | G06F 40/169 |
| 2008/0055272 A1* | 3/2008 | Anzures | G06F 1/1686 |
| | | | 345/173 |
| 2012/0151320 A1* | 6/2012 | McClements, IV | |
| | | | G06Q 10/101 |
| | | | 715/230 |
| 2013/0031216 A1* | 1/2013 | Willis | H04L 65/1069 |
| | | | 709/219 |
| 2016/0299648 A1* | 10/2016 | Migos | G06F 3/0487 |
| 2016/0373498 A1* | 12/2016 | Mandyam | H04L 65/612 |
| 2017/0168542 A1 | 6/2017 | Ren | |
| 2021/0281929 A1* | 9/2021 | Wu | H04N 21/8456 |
| 2022/0057984 A1 | 2/2022 | Yang et al. | |
| 2023/0244715 A1* | 8/2023 | Dalius | G06F 16/639 |
| | | | 715/716 |

FOREIGN PATENT DOCUMENTS

| | | | |
|---|---|---|---|
| CN | 106792075 A | 5/2017 | |
| CN | 108566561 A | 9/2018 | |
| CN | 109063101 A | 12/2018 | |
| CN | 109561352 A | 4/2019 | |
| CN | 111131891 A | 5/2020 | |
| CN | 111711865 A | 9/2020 | |
| CN | 112188255 A | 1/2021 | |
| CN | 112738607 A | 4/2021 | |
| CN | 113282269 A | 8/2021 | |
| CN | 113347503 A | 9/2021 | |
| CN | 113365154 A | 9/2021 | |
| CN | 113727169 A | 11/2021 | |
| CN | 114786063 A | 7/2022 | |
| WO | 2005045594 A2 | 5/2005 | |
| WO | 2021160142 A1 | 8/2021 | |
| WO | 2021249196 A1 | 12/2021 | |

OTHER PUBLICATIONS

Fedina et al., "Lip-Sync: the Evaluation of Audio-to-Video Timing Errors over Shot Intervals", IEEE International Symposium on Consumer Electronics, 2006, 7 pages.

International Search Report and Written Opinion for PCT Patent Application No. PCT/CN2023/080329, mailed Jun. 16, 2023, 17 pages.

Notice of Allowance for Chinese Patent Application No. 202210238660.8, mailed Nov. 9, 2023, 8 pages.

Office Action for Chinese Patent Application No. 202210238660.8, mailed Jun. 16, 2023, 22 pages.

Yanfei et al., "Research and Design of Audio and Video Player Based on Android", Microprocessors, vol. 6, No. 6, Dec. 2017, 4 pages.

Extended European Search Report for European Patent Application No. 23766055.0, mailed on May 12, 2025, 10 pages.

Office Action for Japanese Patent Application No. 2024-553816, mailed on Apr. 1, 2025, 7 pages.

* cited by examiner

AUDIO/VIDEO PROCESSING METHOD AND APPARATUS, DEVICE AND STORAGE MEDIUM FOR SWITCHING BETWEEN AUDIO AND VIDEO PLAYING MODES AND ACQUIRING AUDIO PLAYLIST BASED ON VIDEO BELONGING TO A USER

CROSS-REFERENCE TO RELATED APPLICATIONS

This application is a Continuation Application of International Patent Application No. PCT/CN2023/080329, filed on Mar. 8, 2023, which is based on and claims the benefit of priority to the CN application No. 202210238660.8 filed on Mar. 11, 2022, which are hereby incorporated by reference in their entireties into the present application.

TECHNICAL FIELD

The present disclosure relates to the field of data processing, in particular to an audio and video processing method, device, apparatus and storage medium.

BACKGROUND

With continuous development of multimedia technology applications, people's functional requirements for video applications are becoming more and more diverse.

SUMMARY

In a first aspect, the present disclosure provides an audio and video processing method, which method comprises:
  acquiring an audio corresponding to a target video, in response to a preset trigger operation on a video playing page corresponding to the target video, wherein the target video is a video in a video information stream; and
  switching from the video playing page to an audio playing page, and playing the audio corresponding to the target video on the audio playing page.
In some embodiments, before the playing the audio corresponding to the target video on the audio playing page, the method further comprises:
  acquiring current playing information of the target video, in response to a preset trigger operation on the video playing page corresponding to the target video, wherein the current playing information comprises playing status information and/or playing progress information;
  the playing the audio corresponding to the target video on the audio playing page, comprising:
  playing the audio corresponding to the target video on the audio playing page, based on the current playing information of the target video.
In some embodiments, after the playing the audio corresponding to the target video on the audio playing page, the method further comprises:
  acquiring an audio information stream in which the audio corresponding to the target video is comprised, in response to a preset first page sliding operation on the audio playing page; and
  playing an audio on the audio playing page, based on the audio information stream.
In some embodiments, after the playing the audio corresponding to the target video on the audio playing page, the method further comprises:
  acquiring a first audio playlist of a user corresponding to the target video in response to a preset second page sliding operation on the audio playing page, wherein the first audio playlist comprises an audio corresponding to a video belonging to the user; and
  playing an audio on the audio playing page based on the first audio playlist.
In some embodiments, after the playing the audio corresponding to the target video on the audio playing page, the method further comprises:
  acquiring a video corresponding to the target audio, in response to a preset return operation on the audio playing page playing the target audio; and
  switching from the audio playing page to the video playing page, and playing a video corresponding to the target audio on the video playing page.
In some embodiments, after the playing the audio corresponding to the target video on the audio playing page, the method further comprises:
  presenting, on the audio playing page, comment information corresponding to the audio currently played on the audio playing page in a preset scrolling mode, in response to a trigger operation for a preset first control on the audio playing page.
In some embodiments, an audio cover image is presented on the preset first control, and the audio cover image is a preset frame image in the target video.
In some embodiments, after the playing the audio corresponding to the target video on the audio playing page, the method further comprises:
  displaying a comment panel on the audio playing page in response to a trigger operation for a preset comment control on the audio playing page.
In some embodiments, the method further comprises:
  presenting, in response to a trigger operation for a target identity icon on the audio playing page, a video of a user corresponding to the target identity icon on the audio playing page in a preset floating window mode, wherein the target identity icon is the user identity icon corresponding to a comment on the audio playing page or a user identity icon corresponding to the audio currently played;
  determining a second audio playlist based on the video of the user corresponding to the target identity icon, in response to a trigger operation for a first video of the video of the user corresponding to the target identity icon, wherein in the second audio playlist, an audio corresponding to the first video is taken as an audio to be played at a first place; and
  playing an audio on the audio playing page, based on the second audio playlist.
In some embodiments, after the playing the audio corresponding to the target video on the audio playing page, the method further comprises:
  performing a fast-forward playback or a fast-backward playback for the audio corresponding to the target video for a preset time, in response to a trigger operation for a fast-forward control or a fast-backward control on the audio playing page.
In some embodiments, after the playing the audio corresponding to the target video on the audio playing page, the method further comprises:
  presenting a timing interface on the audio playing page, in response to a trigger operation for a timing control on the audio playing page; and
  determining timing information for the audio playing page based on the timing interface, wherein the timing information is configured to timely close the application corresponding to the audio playing page.

In a second aspect, the present disclosure provides an audio and video processing device, which device comprises:

a first acquiring module configured to acquire an audio corresponding to a target video, in response to a preset trigger operation on a video playing page corresponding to the target video, the target video being a video in a video information stream; and a first playing module configured to switch from the video playing page to an audio playing page, and playing the audio corresponding to the target video on the audio playing page.

In a third aspect, the present disclosure provides a non-transitory computer-readable storage medium, in which an instruction is stored, which instruction, when run on a terminal device, causes the terminal device to realize the above method.

In a fourth aspect, the present disclosure provides an audio and video processing device, comprising a memory, a processor, and a computer program stored in the memory and executable on the processor, and when the processor executes the computer program, the above method is realized.

In a fifth aspect, the present disclosure provides a computer program product comprising a computer program/instruction which, when executed by the processor, implement the above method.

In a sixth aspect, the present disclosure provides a computer program, comprising an instruction that, when executed by the processor, causes the processor to perform the audio and video processing method according to any one of the above embodiments.

BRIEF DESCRIPTION OF THE DRAWINGS

Drawings here are incorporated into and constitute part of the description. These drawings show the embodiments in line with the present disclosure and serve to explain the principles of the present disclosure, together with the description.

In order to more clearly explain the embodiments of the present disclosure or the technical solutions in the prior arts, drawings used in the description of the embodiments or the prior arts will be briefly described below. Obviously, those skilled in the art can obtain further drawings according to these drawings without any creative effort.

DETAILED DESCRIPTION

In order to understand the above objectives, features and advantages of the present disclosure more clearly, technical solutions of the present disclosure will be further described below. It should be noted that embodiments of the present disclosure and features in the embodiments can be combined with each other in case of no conflict.

In the description below, many specific details are set forth in order to fully understand the present disclosure, but the present disclosure may be practiced in other ways than those described herein; obviously, the embodiments described below are only part of the embodiments, rather than all of the embodiments.

As mentioned above, how to enrich function of a video application, meet the user's needs for more scenes, and thus improve the user's experience is a technical problem that needs to be solved urgently at present.

In order to solve the above-mentioned technical problem, the present disclosure provides an audio and video processing method, which can play an audio corresponding to a target video on an audio playing page to carry the audio playback based on a page, which can meet the user's needs for more scenes, thus improving the user's experience.

With continuous development of multimedia technology applications, people's functional requirements for video applications are becoming more and more diverse. For example, in some scenes where it is inconvenient to watch a short video, the user desires to continue playing an audio corresponding to the short video. Therefore, how to enrich function of a video application, realize the audio playback carried based on a page, meet the user's needs for more scenes, and thus improve the user's experience is a technical problem that needs to be solved urgently at present.

In order to meet the user's needs for more scenes, thus improving the user experience, the embodiments of the present disclosure provide an audio and video processing method. Firstly, acquiring an audio corresponding to a target video in response to a preset trigger operation on a video playing page corresponding to the target video, wherein the target video is a video in a video information stream, then, switching from the video playing page to an audio playing page, and playing the audio corresponding to the target video on the audio playing page. It can be seen that, the embodiments of the present disclosure can realize playing an audio corresponding to a target video on an audio playing page to carry the audio playback based on a page, can meet the user's needs for more scenes, thus improving the user's experience.

Figure 1:
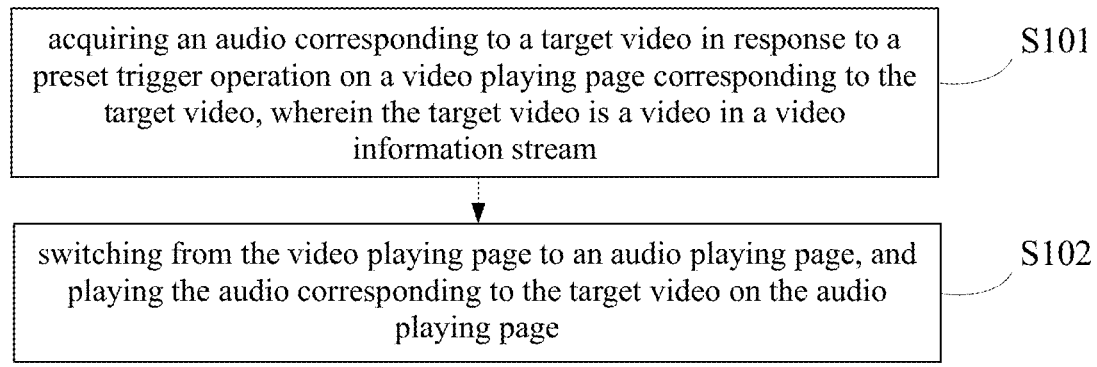
FIG. 1 is a flowchart of some embodiments of an audio and video processing method provided by some embodiments of the present disclosure.

Based on this, the embodiments of the present disclosure provide an audio and video processing method. FIG. 1 is a flowchart of some embodiments of an audio and video processing method provided by some embodiments of the present disclosure, the method comprising:

S101: acquiring an audio corresponding to a target video, in response to a preset trigger operation on a video playing page corresponding to the target video, wherein the target video is a video in a video information stream.

The audio and video processing method provided by the embodiments of the present disclosure can be applied to a client. For example, the client can comprise clients deployed on smart phones, clients deployed on tablet computers, and so on.

In the embodiments of the present disclosure, in response to playing the target video in the video information stream on the video playing page, the preset trigger operation can also be performed on the video playing page concurrently. Acquiring an audio corresponding to a target video, in response to a preset trigger operation on a video playing page corresponding to the target video being received, wherein the acquired audio comprises content items comprised in all video tracks corresponding to the target video.

In the embodiments of the present disclosure, the preset trigger operation may comprise various implementations. For example, a first implementation comprises triggering a press and hold operation for any blank position on the video playing page, and displaying a plurality of function options comprising preset functions (such functions as not interested, saving to local, collecting, sharing, etc.), and triggering a click operation for the preset function; a second implementation comprises triggering a press and hold operation for a preset audio control provided on the video playing page, wherein the preset audio control may be provided at any position on the video playing page (such as the lower right corner, directly below the video playing page, etc.), the preset audio control may be provided in any shape (such as square, circle, etc.), and so on.

It needs to be noted that the embodiments of the present disclosure does not limit the specific style and location of the preset audio control provided on the video playing page.

In some embodiments, in response to detecting that the target video has been played more than a preset number of times, a preset guidance prompt (such as "press and hold for a surprise" pointing to the preset audio control, etc.) may be displayed at a position corresponding to the preset audio control, so as to produce an effective prompt. For one same target user, the number of preset guidance prompts may be set not to be greater than a preset number-of-times threshold (for example, 3 times), and the time interval for displaying preset guidance prompts may be set to be greater than a preset time threshold (for example, 3 days).

It needs to be noted that the embodiments of the present disclosure do not limit the specific prompt language of the preset guidance prompt and the specific numerical values corresponding to the preset number-of-times threshold and the preset time threshold respectively.

Figure 2:
FIG. 2 is a schematic diagram of some embodiments of a video playing page provided by some embodiments of the present disclosure.

FIG. 2 is a schematic diagram of some embodiments of a video playing page provided by some embodiments of the present disclosure. With a target video played on the video playing page, a preset audio control 201 is provided at the lower right corner of the video playing page, and the preset audio control is provided in a square turntable style, accompanied by a dynamic effect of rotation. Further, a preset guidance prompt "press and hold for a surprise" is displayed at the position of the preset audio control. In response to a press and hold operation for the preset audio control on the video playing page corresponding to the target video being received, an audio corresponding to the target video is acquired.

S102: switching from the video playing page to an audio playing page, and playing the audio corresponding to the target video on the audio playing page.

In the embodiments of the present disclosure, after acquiring an audio corresponding to a target video in response to a preset trigger operation on a video playing page corresponding to the target video based on the S102, a page may be switched from the video playing page to an audio playing page, and the acquired audio may be play on the audio playing page.

In the embodiments of the present disclosure, the audio playing page may comprise the identity icon of the target video poster and user identification (such as user ID), preset audio control displayed enlarged, playing progress bar control corresponding to the audio, page return control, and the like, wherein the cover image corresponding to the preset audio control enlarged display can be a video cover image of the target video, an identity image of the target video poster, and so on.

Compared with the prior arts, the technical solution provided by the embodiments of the present disclosure has at least the following advantages.

The embodiments of the present disclosure provide an audio and video processing method. Firstly, acquiring an audio corresponding to a target video, in response to a preset trigger operation on a video playing page corresponding to the target video, wherein the target video is a video in a video information stream, then, switching from the video playing page to an audio playing page, and playing the audio corresponding to the target video on the audio playing page. It can be seen that, the embodiments of the present disclosure can realize playing an audio corresponding to a target video on an audio playing page, and carrying the audio playback based on a page, can meet the user's needs for more scenes, thus improving the user's experience.

In some embodiments, after the playing the audio corresponding to the target video on the audio playing page, firstly, acquiring a video corresponding to a target audio, in response to a preset trigger operation on an audio playing page playing the target audio; then, switching from the audio playing page to a video playing page, and playing the video corresponding to the target audio on the video playing page.

In the embodiments of the present disclosure, the audio playing page playing the target audio may comprise a preset page return control. In response to a trigger operation (that is, a preset return operation) for a page return control on an audio playing page being received, a video corresponding to the target audio is acquired. The acquired video comprises content items comprised in all audio tracks corresponding to the target audio, and may also comprise at least one of the playing status information or playing progress information corresponding to the target audio. Then, based on the acquired video corresponding to the target audio, the current audio playing page may be quit. Returning to the video playing page corresponding to the target video, and playing a video corresponding to the target audio on the video playing page.

Figure 3:
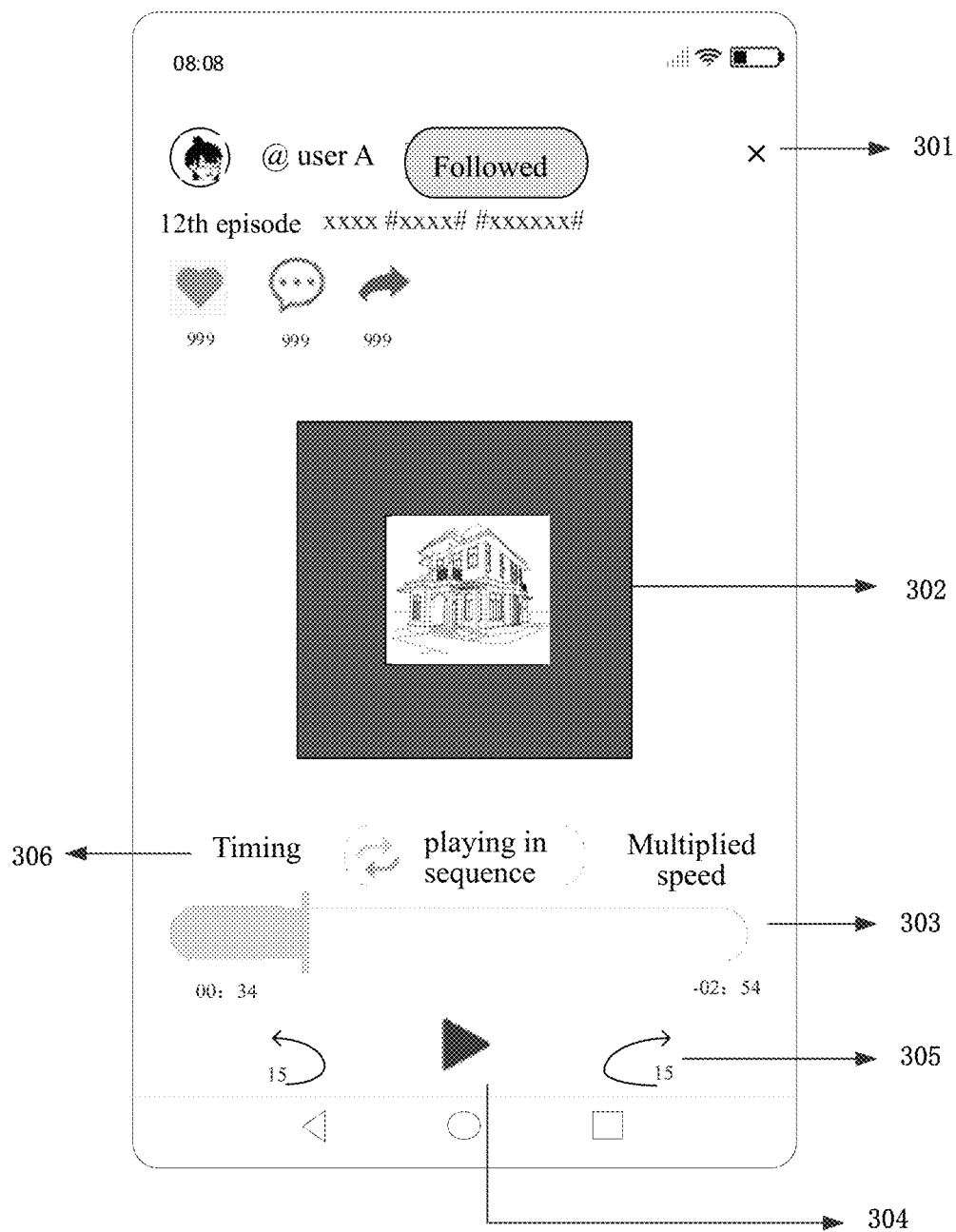
FIG. 3 is a schematic diagram of some embodiments of an audio playing page provided by some embodiments of the present disclosure.

FIG. 3 is a schematic diagram of some embodiments of an audio playing page provided by some embodiments of the present disclosure. An audio corresponding to the target video is played on the audio playing page, and the identity icon and user ID of the target video poster (such as user A) are provided in a position of the upper left corner of the audio playing page; a page return control 301 is provided at a position of the upper right corner; a preset audio control 302 displayed with equal scale enlargement is provided in a middle position, the preset audio control 302 is provided in a square turntable style, accompanied by a dynamic effect of rotation, and a cover image corresponding to the preset audio control 302 may be a video cover image of the target video; a playing progress bar control 303 and a play/pause control 304 corresponding to the audio are provided directly below. In response to a trigger operation being received for the play/pause control on the audio playing page, the audio may be controlled to be played or paused.

In some embodiments, after switching from the video playing page to an audio playing page, the user may be informed in the form of a pop-up window on the audio playing page that the audio playing page is switched to successfully and the preset function mode is entered. The preset function mode may be named as listening mode, audio mode, or the like. The embodiments of the present disclosure does not limit the specific naming of the preset function mode. For example, the pop-up window may comprise a prompt phrase (such as "listening mode is entered") and a preset control (such as "I know" control) to inform the user that the listening mode is entered. The user may also be informed that after entering the listening mode, the playback of the audio is still continued after locking the screen or switching to the background, wherein the pop-up prompt may be closed by triggering the click operation for the preset control.

In some embodiments, in response to a trigger operation for a fast-forward control or fast-backward control on the audio playing page, performing a fast-forward playback or a fast-backward playback for the audio corresponding to the target video for a preset time.

In the embodiments of the present disclosure, the audio playing page may further comprise a fast-forward control and a fast-backward control, referring to the schematic diagram of some embodiments of an audio playing page as shown in FIG. 3. A fast forward control and a fast backward control 305 are also provided at a lower position of the audio playing page. In response to a trigger operation for a fast-forward control or a fast-backward control on the audio playing page being received, performing fast-forward playback or fast-backward playback for the audio corresponding to the target video for a preset time. The trigger operation for the fast forward control or fast backward control may comprise a click operation or a press and hold operation. For example, assuming that the preset time is 15 seconds, the current audio is played until 00:47, in response to a click operation triggered for the fast-forward control on the audio playing page being received, the audio corresponding to the target video is fast-forwarded for 15 seconds, that is, the current audio continues to play from 01:02.

In the embodiments of the present disclosure, in response to a press and hold operation for a fast-forward control or a fast-backward control on the audio playing page being received, performing fast-forward playback or fast-backward playback for the audio corresponding to the target video at a multiplied speed (such as 2×, 3×, or the like). Here, the corresponding icon of the fast-forward control or the fast-backward control may be switched from a normal state (such as the icon of the fast-forward control or the fast-backward control 305 as shown in FIG. 3) to a fast-forward or fast-backward dynamic icon.

Figure 4:
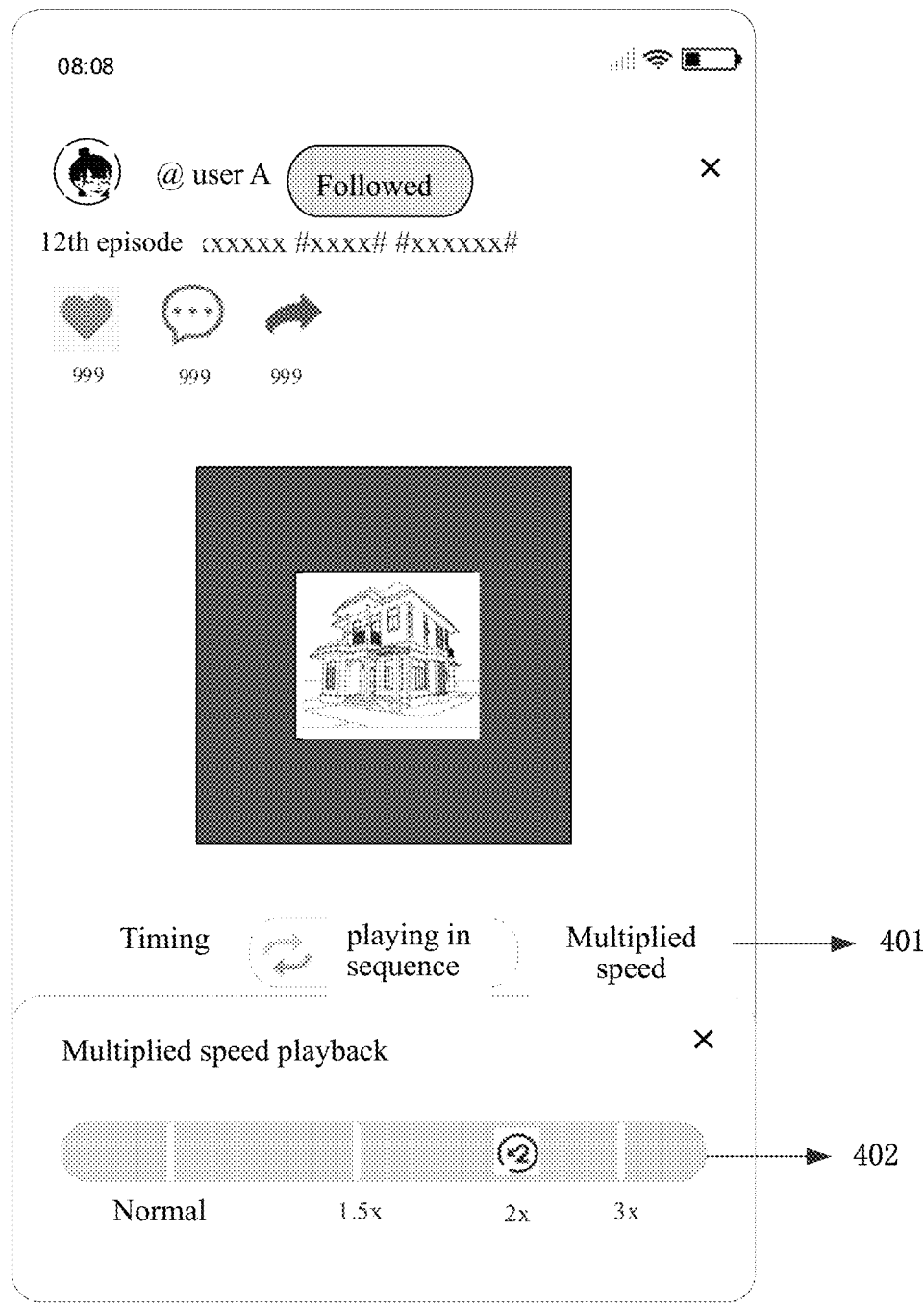
FIG. 4 is a schematic diagram of some further embodiments of an audio playing page provided by some embodiments of the present disclosure.

FIG. 4 is a schematic diagram of some further embodiments of an audio playing page provided by some embodiments of the present disclosure. The audio playing page is also provided with a multiplied speed control 401. In response to a trigger operation for the multiplied speed control 401 being received, a multiplied speed drag bar 402 is displayed in the form of a semi-floating window on the audio playing page. The multiplied speed drag bar comprises a variety of multiplied speed options (such as normal, 1.5×, 2×, 3×, etc.). In response to a drag operation for the multiplied speed drag bar being received, the corresponding multiplied speed may be selected. And the selected multiplied speed may be highlighted.

In some embodiments, presenting a timing interface on the audio playing page, in response to a trigger operation for a timing control on the audio playing page. Determining timing information for the audio playing page based on the timing interface, wherein the timing information is configured to timely close the application corresponding to the audio playing page.

In the embodiments of the present disclosure, the audio playing page may further comprise a timing control, referring to the schematic diagram of some embodiments of an audio playing page as shown in FIG. 3. A timing control 306 is also provided at a lower position of the audio playing page. Presenting a timing interface on the audio playing page, in response to a trigger operation for the timing control on the audio playing page being received. The timing information for the audio playing page is determined, based on the timing interface. In response to the audio played on the audio playing page being played for a time corresponding to the timing information, the application corresponding to the audio playing page may be automatically closed.

Figure 5:
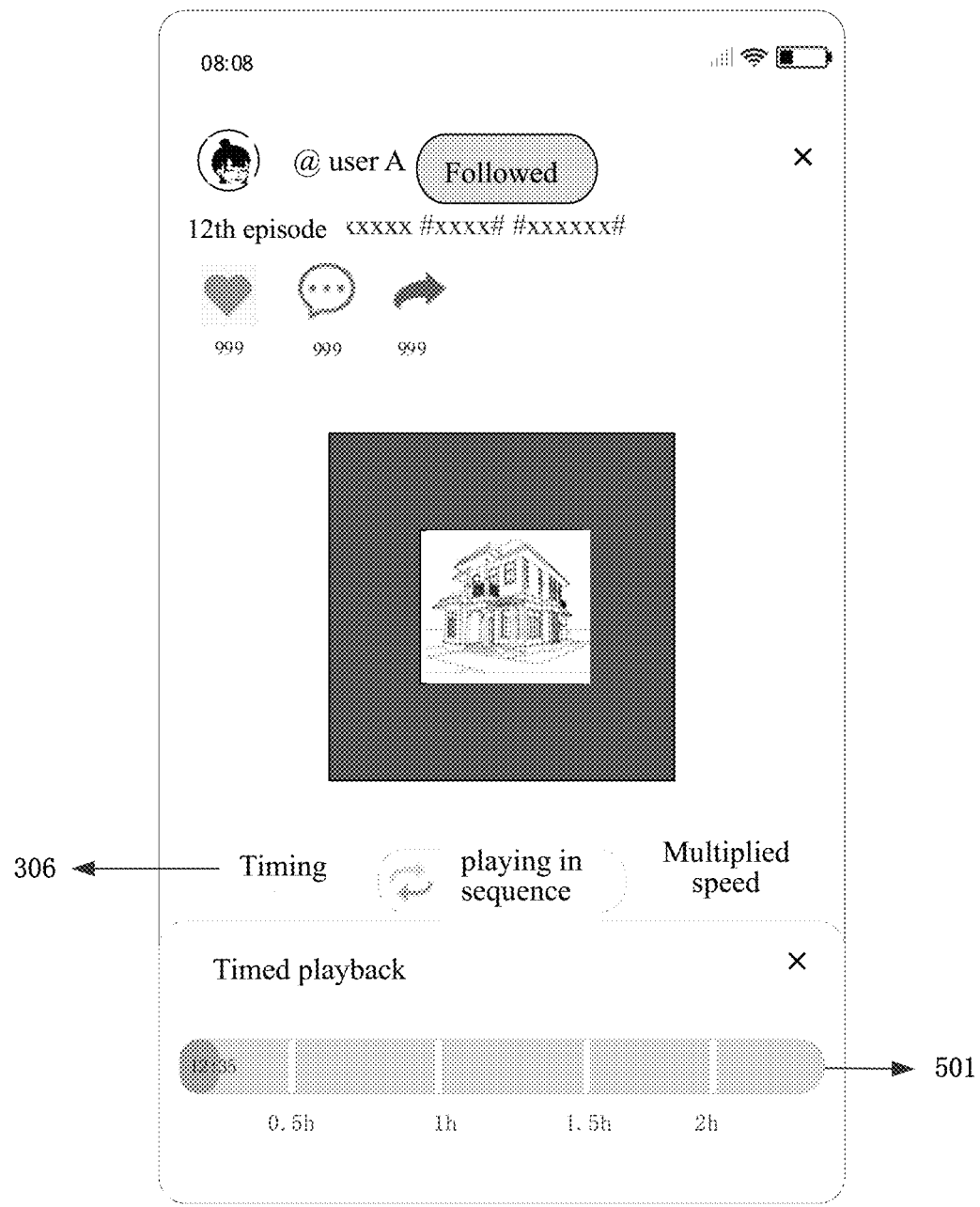
FIG. 5 is a schematic diagram of some furthermore embodiments of an audio playing page provided by some embodiments of the present disclosure.

FIG. 5 is a schematic diagram of some furthermore embodiments of an audio playing page provided by some embodiments of the present disclosure. In response to a trigger operation for the multiplied speed control 306 being received, a multiplied speed drag bar 501 is displayed in the form of a semi-floating window on the audio playing page. In response to a drag operation for the timing drag bar being received, the timing information for the audio playing page (such as 12:35) is determined. And the determined timing information may be highlighted (for example, the determined time information is displayed on the timing drag bar). As so, based on the determined timing information, in response to the audio played on the audio playing page being played for 12 minutes and 35 seconds, the application corresponding to the audio playing page may be automatically closed.

In order to improve the user's experience, after switching from the video playing page to the audio playing page, playing the audio corresponding to the target video in an inherited manner, so as to improve the user's uninterrupted experience during audio-video conversion.

In some embodiments, first, acquiring current playing information of a target video, in response to a preset trigger operation on a video playing page corresponding to the target video. Then, playing the audio corresponding to the target video on the audio playing page, based on the current playing information of the target video, wherein the current playing information comprises playing status information and/or playing progress information.

In the embodiments of the present disclosure, acquiring current playing information of the target video, in response to a preset trigger operation on the video playing page corresponding to the target video being received. Then, playing the audio corresponding to the target video on the audio playing page, based on the current playing information, wherein the current playing information comprises at least one of playing status information or playing progress information. The playing status information may comprise current playing status information, pause status information and multiplied speed status information, and the playing progress information may comprise playing time information.

For example, in response to a preset trigger operation on the video playing page corresponding to the target video being received, acquiring the current playing information of the target video, comprising current playing status information and playing time information (such as playing to the 47th second), indicating that the target video is played until 00:47, and then the audio corresponding to the target video is continuously played on the audio playing page from 00:47 based on the current playing information; in response to a preset trigger operation being received on the video playing page corresponding to the target video, acquiring the current playing information of the target video, comprising pause state information, indicating that the target video is currently in a pause state, and then the audio corresponding to the target video is paused on the audio playing page based on the current playing information (for example, the play/pause control on the audio playing page is in a pause state), in response to a click operation for the play/pause control being received, the audio corresponding to the target video may be restarted.

In the embodiments of the present disclosure, the audio corresponding to the target video and the target video have the same number of likes, comments, forwards, and content of comments. Therefore, the current playing information of the target video corresponding to the target video may also comprise like information, comment information, forwarding information, etc. Based on the current playing information, in response to the audio corresponding to the target video being played on the audio playing page, the number of likes, comments, forwards etc. of the audio corresponding to the target video may be presented on the audio playing page. Referring to the schematic diagram of some embodiments of an audio playing page as shown in FIG. 3, the number of likes, the number of comments and the number of forwards of the audio are displayed below the identity icon and the user ID of the target video poster (such as user A) on the audio playing page.

In some embodiments, after the audio corresponding to the target video is played on the audio playing page, a comment panel can be displayed on the audio playing page, in response to a trigger operation for a preset comment control on the audio playing page.

In the embodiments of the present disclosure, the audio playing page may comprise a preset page return control set in advance. For example, on the audio playing page shown in FIG. 3, the preset comment control may present the number of comments. In response to a click operation triggered by the preset comment control displayed on the audio playing page being received, the comment panel may be presented on the audio playing page in the form of a semi-floating window, and specific comment content of the comment information corresponding to the target video is presented on the comment panel, and more comment content may be viewed by sliding up or down manually.

The target video played on the video playing page is a video in a video recommendation stream sent by the server to the client. The video recommendation stream comprises one or more recommended videos that have been loaded locally. In response to switching from the video playing page to the audio playing page, and in response to playing the audio, an audio recommendation stream which is more suitable for the preset function mode (such as listening mode) may be recommended for the user by replacing the current recommendation stream, so as to achieve the effect of content differentiation.

In some embodiments, acquiring an audio information stream in which the audio corresponding to the target video is comprised, in response to a preset first page sliding operation on the audio playing page. Playing an audio on the audio playing page, based on the audio information stream.

In the embodiments of the present disclosure, the preset first page sliding operation may comprise triggering an upward or downward sliding operation for any position on the audio playing page. Acquiring an audio information stream in which the audio corresponding to the target video is comprised, in response to a preset first page sliding operation on the audio playing page being received. Audio in the audio information stream may comprise an audio corresponding to each video in the local video information stream; alternatively, audio in the audio information stream may also comprise an audio (such as user-interested talk shows, cross talks, lectures, etc.) recommended based on the user' interests or based on popular hotspots that are more suitable for preset function modes (such as listening mode) and so on. Then, replacing the video recommendation stream in which the target video is comprised with an audio information stream, and playing the audio on the audio playing page based on the audio information stream, wherein the manner of playing the audio may comprise loop playing (such as single audio loop playing), sequential playing and the like.

For example, it is assumed that the audio in the audio information stream comprises an audio corresponding to each video in the video information stream loaded locally. Taking, as an example, that the video information stream in which the target video (such as video A) is comprised also comprises video B, video C, video D, etc., in response to an upward sliding operation for the audio playing page being received, acquiring an audio information stream (such as audio information stream 1) in which audio a corresponding to video A is comprised; then, audio information stream 1 also comprises audio b corresponding to video B, audio c corresponding to video C, audio d corresponding to video D, etc.; then, replacing video A, video B, video V and video D with audio a, audio b, audio c and audio d; and further, playing audio a, audio b, audio c and audio d on the audio playing page; in response to a downward sliding operation for the audio playing page being received, still playing the audio based on the audio information stream 1, and a playing order may be audio d-audio c-audio b-audio a.

It is assumed that the audio in the audio information stream comprises an audio recommended based on the user's interest points, popular hotspots, etc., which is more suitable for the preset function mode (such as listening mode). Taking, as an example, that the video information stream in which the target video (such as video A) is comprised also comprises video B, video C, video D, etc., in response to an upward sliding operation for the audio playing page being received, acquiring an audio information stream (such as audio information stream 2) in which audio a corresponding to video A is comprised; then, audio information stream 2 may comprise audio b' (such as crosstalk 1), audio c' (such as crosstalk 2), audio d' (such as crosstalk 3) etc. which are recommended based on the user's interest points; then, replacing video A, video B, video C and video D with audio a, audio b,' audio c' and audio d'; and further, playing sequentially such audios as audio a, audio b', audio c', audio d', etc. on the audio playing page based on the user's operation.

Further, in some embodiments, acquiring a first audio playlist of the user corresponding to the target video in response to a preset second page sliding operation on the audio playing page. Playing an audio on an audio playing page based on a first audio playlist, wherein the first audio playlist comprises audios corresponding respectively to the videos of the user corresponding to the target video.

In the embodiments of the present disclosure, the preset second page sliding operation may comprise triggering a leftward or rightward sliding operation for any position on the audio playing page. Acquiring a first audio playlist of a user corresponding to the target video, in response to a preset second page sliding operation on the audio playing page being received; replacing a video recommendation stream in which the target video is comprised, with audios corresponding respectively to videos posted by the target video poster comprised in the first audio playlist. Then, playing the audio in the first audio playlist on the audio playing page, wherein the manner of playing the audio may comprise cyclic playing (such as single audio cyclic playing), sequential playing, or the like.

In some embodiments, for example, in a scene where the user is inconvenient to operate by hand, comment content corresponding to the audio currently played may be presented for the user based on the manner of automatically scrolling the comments, which simplifies the user's operation and improves the user's experience.

In some embodiments, in response to a trigger operation for a preset first control on the audio playing page, presenting, on the audio playing page, comment information corresponding to the audio currently played on the audio playing page, in a preset scrolling mode.

In the embodiments of the present disclosure, the preset first control may comprise a preset audio control 302. In response to a trigger operation for a preset audio control on the audio playing page being received, presenting, on the audio playing page, comment information corresponding to the audio currently played on the audio playing page, in a preset scrolling mode. The comment information corresponding to the audio currently played may be comment information posted by other users based on the video corresponding to the audio currently played; or the comment information corresponding to the audio currently played may be comment information posted by other users based only on the audio currently played, etc. The preset scrolling mode may comprise such modes as upward scrolling presentation, downward scrolling presentation, floating presentation, etc.

In the embodiments of the present disclosure, in response to a click operation being triggered for a piece of comment information, the comment information may be presented in the form of a semi-floating window on the audio playing page, that is, the comment panel may be presented. And locating the clicked target comment information position on the comment panel, and unfolding reply comment information comprised in the target comment information.

In some embodiments, an audio cover image is presented on the preset first control, and the audio cover image is a preset frame image in the target video.

In the embodiments of the present disclosure, the preset first control may be a preset audio control 302, and an audio cover image may be presented on the preset audio control 302. For example, the audio cover image may comprise a preset frame image of the target video corresponding to the audio currently played, an identity icon of the target video poster, and the like. In some embodiments, the first frame image of the target video corresponding to the audio currently played may be displayed on the preset audio control 302.

Figure 6:
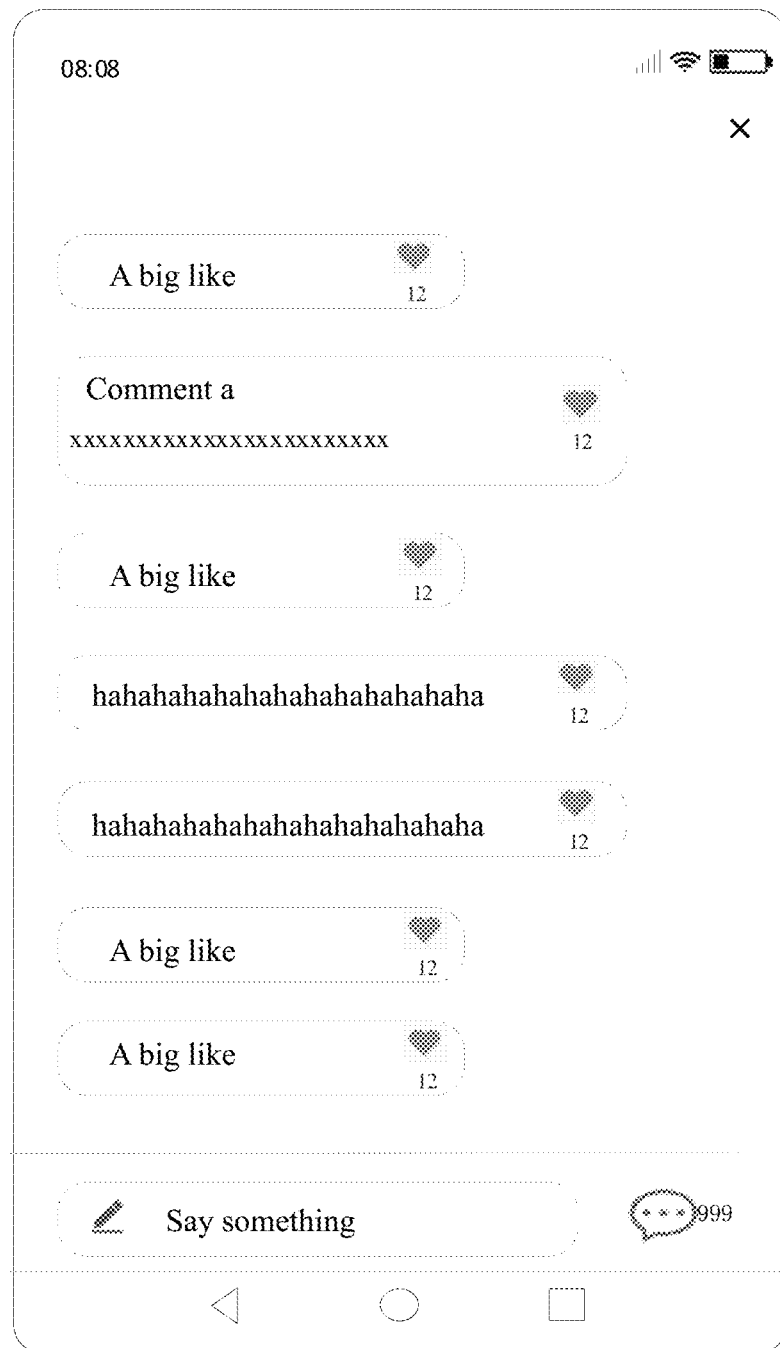
FIG. 6 is a schematic diagram of some embodiments of a comment information scrolling panel provided by some embodiments of the present disclosure.

FIG. 6 is a schematic diagram of some embodiments of a comment information scrolling panel provided by some embodiments of the present disclosure. The comment information corresponding to the audio currently played is automatically presented on the comment information scrolling panel in an upward scrolling mode. An upper right corner position on the comment information scrolling panel may also comprise a close control. In response to a trigger operation for the close control, the current comment information scrolling panel may be exited to return to the audio playing page.

Figure 7:
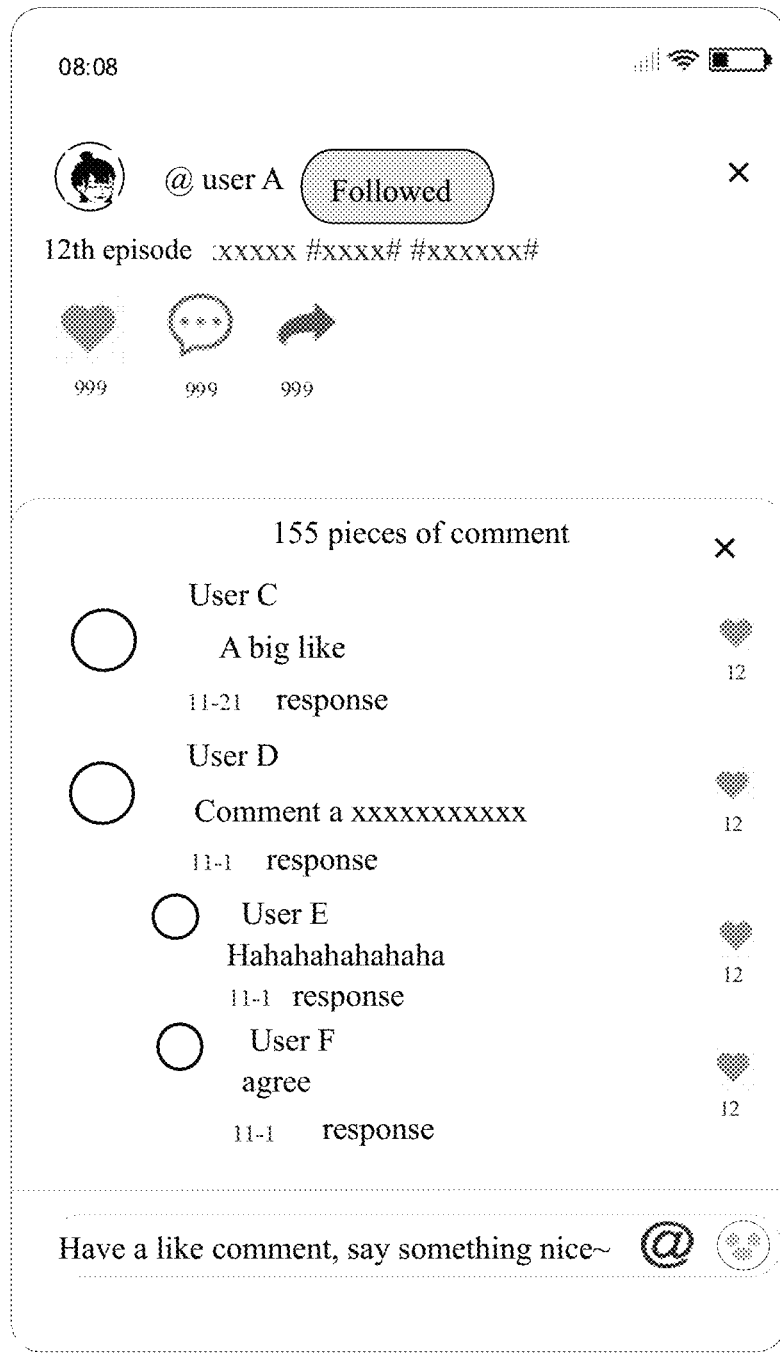
FIG. 7 is a schematic diagram of some embodiments of a comment panel provided by some embodiments of the present disclosure.

FIG. 7 is a schematic diagram of some embodiments of a comment panel provided by some embodiments of the present disclosure.

Presenting the comment panel in a semi-floating window mode on the audio playing page. In response to a trigger operation being received for the comment a on the comment information scrolling panel as shown in FIG. 6, presenting the comment a and reply comment information corresponding to the comment a on the comment panel as shown in FIG. 7.

In some embodiments, switching between two audio playing pages may be realized according to the following steps A1-A3.

Step A1: in response to a trigger operation for a target identity icon on the audio playing page, presenting a video of the user corresponding to the target identity icon on the audio playing page in a preset floating window mode.

The target identity icon is the user identity icon of the user commenting on the audio playing page or the user identity icon corresponding to the audio currently played.

In the embodiments of the present disclosure, in response to a trigger operation being received for an identity icon of a user corresponding to any comment information on the comment panel unfolded on the audio playing page, or in response to a trigger operation being received for an identity icon of a user corresponding to the audio currently played on the audio playing page, a video of the user corresponding to the identity icon of the user may be presented in the semi-floating window mode on the audio playing page. In response to the user corresponding to the identity icon does not post any video, preset reminder information may be displayed in a pop-up window mode on the audio playing page. For example, the preset reminder information may comprise "This user has not posted any video yet, no video can be shown temporarily" and so on.

Step A2: determining a second audio playlist based on the video of the user corresponding to the target identity icon, in response to a trigger operation for a first video of the video of the user corresponding to the target identity icon.

Wherein in the second audio playlist, an audio corresponding to the first video being taken as an audio to be played at a first place.

In the embodiments of the present disclosure, based on the video of the user corresponding to the target identity icon shown in the above step A1, in response to a trigger operation being received for the first video of the videos of the user (such as user B) corresponding to the target identity icon, acquiring a first audio corresponding to the first video; determining a second audio playlist based on the video of user B, wherein the second audio playlist comprises audios corresponding to all videos posted by user B; and, the first audio is played as the audio to be placed at the first place in the second audio playlist.

Step A3: then, playing an audio on the audio playing page based on the second audio playlist.

In the embodiments of the present disclosure, based on the second audio playlist determined in the above step A2, playing an audio on the audio playing page; taking an audio corresponding to the first video (such as the first audio) as the audio to be played at the first place. In response to a downward slide operation being triggered for any position on the audio playing page, playing the next audio of the first audio in the second audio playlist; in response to an upward sliding operation being triggered for any position on the audio playing page, playing the previous audio of the first audio in the second audio playlist.

In the embodiments of the present disclosure, the audio playing page in step A3 is an audio playing page corresponding to any audio in the second audio playlist. Different from the audio playing page presenting the video of the user corresponding to the target identity icon in step A1, switching between the two audio playing pages is realized.

Figure 8:
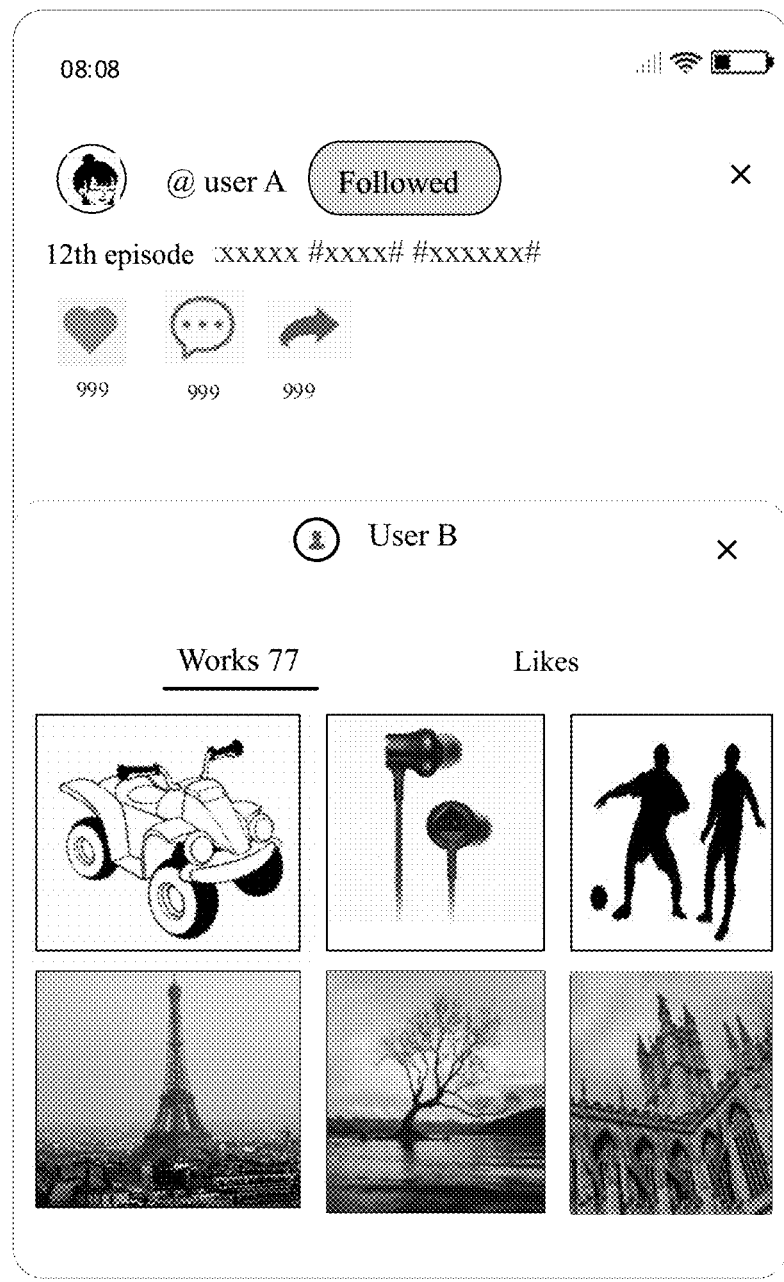
FIG. 8 is a schematic diagram of some further embodiments of an audio playing page provided by some embodiments of the present disclosure.

For example, assuming that a click operation is triggered for a identity icon of a user corresponding to a piece of comment information on the comment panel unfolded on the audio playing page A, a video of the user corresponding to the identity icon may be presented in a semi-floating window mode on the audio playing page A. FIG. 8 is a schematic diagram of some further embodiments of an audio playing page provided by some embodiments of the present disclosure, in which the audio playing page shown in FIG. 8 is an audio playing page A, and videos of user B (for example, at least comprising video 1 to video 6 as shown in FIG. 8) are presented in a semi-floating window mode on the audio playing page A. In response to a trigger operation being received for video 4 in the videos posted by user B, acquiring audio 4 corresponding to video 4, and a second audio playlist determined based on the videos posted by user B comprises at least audio 1-audio 6, and audio 4 is taken as the audio to be played at the first place. In the process of playing the audio 4 on the audio playing page B, in response to a sliding operation being triggered for any position on the audio playing page B, audio 5 in the second audio playing list is played; in the process of playing audio 4 on the audio playing page B, in response to a sliding down operation being triggered for any position on the audio playing page B, audio 3 in the second audio playing list is played.

In the audio and video processing method provided by the embodiments of the present disclosure, firstly, acquiring an audio corresponding to a target video, in response to a preset trigger operation on a video playing page corresponding to the target video, wherein the target video is a video in a video information stream, then, switching from the video playing page to an audio playing page, and playing the audio corresponding to the target video on the audio playing page. It can be seen that, the embodiments of the present disclosure can realize playing an audio corresponding to a target video on an audio playing page to carry the audio playback based on a page, can meet the user's needs for more scenes, thus improving the user's experience.

In addition, the audio and video processing method provided by the embodiments of the present disclosure can also support the execution of trigger operations for various preset controls on the audio playing page, thus enriching the playing and controlling function of the audio playing page, and by updating the recommendation stream through the preset sliding operation on the audio playing page, content differentiation is realized, and the user's experience is improved.

Figure 9:
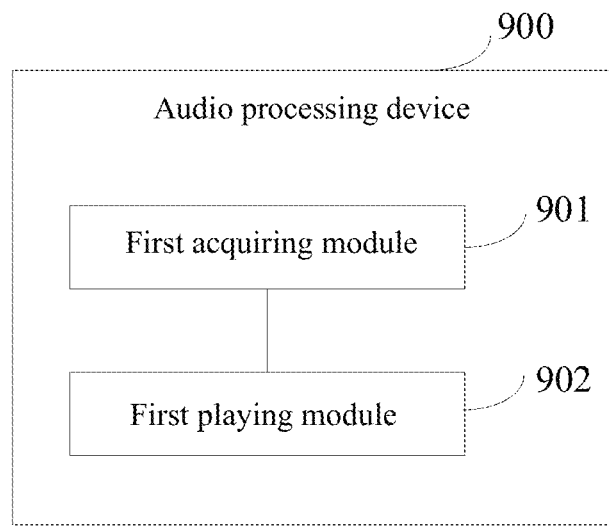
FIG. 9 is a schematic structural diagram of some embodiments of an audio and video processing device provided by some embodiments of the present disclosure.

Based on the same inventive concept as the above embodiments, the embodiments of the present disclosure also provide an audio and video processing device. FIG. 9 is a schematic structural diagram of some embodiments of an audio and video processing device provided by an embodiment of the present disclosure. The audio and video processing device 900 comprises:
  a first acquiring module 901 for acquiring an audio corresponding to a target video in response to a preset trigger operation on a video playing page corresponding to the target video, wherein the target video is a video in a video information stream; and
  a first playing module 902 for switching from the video playing page to an audio playing page, and playing the audio corresponding to the target video on the audio playing page.

In some embodiments, the device further comprises:
  a second acquiring module for acquiring current playing information of the target video in response to a preset trigger operation on the video playing page corresponding to the target video, wherein the current playing information comprises playing status information and/or playing progress information;
  correspondingly, the first playing module 902 comprises:
  a playing sub-module for playing the audio corresponding to the target video on the audio playing page, based on the current playing information of the target video.

In some embodiments, the device further comprises:
  a third acquiring module for acquiring an audio information stream in which the audio corresponding to the target video is comprised in response to a preset first page sliding operation on the audio playing page;
  a second playing module for playing an audio on the audio playing page, based on the audio information stream.

In some embodiments, the device further comprises:
  a fourth acquiring module for acquiring a first audio playlist of a user corresponding to the target video in response to a preset second page sliding operation on the audio playing page, wherein the first audio playlist comprises an audio corresponding to a video belonging to the user; and
  a third playing module for playing an audio on the audio playing page based on the first audio playlist.

In some embodiments, the device further comprises:
  a fifth acquiring module for acquiring a video corresponding to the target audio in response to a preset return operation on the audio playing page playing the target audio; and
  a fourth playing module for switching from the audio playing page to the video playing page, and playing a video corresponding to the target audio on the video playing page.

In some embodiments, the device further comprises:
  a first displaying module for displaying on the audio playing page, comment information corresponding to the audio currently played on the audio playing page in a preset scrolling mode, in response to a trigger operation for a preset first control on the audio playing page.

In some embodiments, an audio cover image is presented on the preset first control, and the audio cover image is a preset frame image in the target video.

In some embodiments, the device further comprises:
  a displaying module for displaying a comment panel on the audio playing page in response to a trigger operation for a preset comment control on the audio playing page.

In some embodiments, the device further comprises:
a second displaying module for, in response to a trigger operation for a target identity icon on the audio playing page, presenting a video of the user corresponding to the target identity icon on the audio playing page in a preset floating window mode, wherein the target identity icon is the user identity icon corresponding to the comments on the audio playing page or the user identity icon corresponding to the audio currently played;
a first determining module for determining a second audio playlist based on the video of the user corresponding to the target identity icon in response to a trigger operation for a first video of the video of the user corresponding to the target identity icon, wherein, in a second audio playlist, an audio corresponding to the first video is the audio to be played at the first place; and
a fifth playing module for playing an audio on the audio playing page based on the second audio playlist.

In some embodiments, the device further comprises:
a sixth playing module for, in response to a trigger operation for a fast-forward control or fast-backward control on the audio playing page, performing a fast-forward playback or a fast-backward playback or the audio corresponding to the target video for a preset time.

In some embodiments, the device further comprises:
a third displaying module for presenting a timing interface on the audio playing page in response to a trigger operation for a timing control on the audio playing page; and
a second determining module for determining timing information for the audio playing page based on the timing interface; wherein, the timing information is configured for timely closing the application corresponding to the audio playing page.

In the audio and video processing device provided by the embodiments of the present disclosure, firstly, acquiring an audio corresponding to a target video in response to a preset trigger operation on a video playing page corresponding to the target video, wherein the target video is a video in a video information stream, then, switching from the video playing page to an audio playing page, and playing the audio corresponding to the target video on the audio playing page. It can be seen that, the embodiments of the present disclosure can realize playing an audio corresponding to a target video on an audio playing page to carry the audio playback based on a page, can meet the user's needs for more scenes, thus improving the user's experience.

Besides the above method and device, some embodiments of the present disclosure further provides a non-transitory computer-readable storage medium, in which an instruction is stored, which instruction, when run on a terminal device, causes the terminal device to realize the audio and video processing method as recited in the embodiment of the present disclosure.

Some embodiments of the present disclosure further provide a computer program product comprising a computer program/instruction which, when executed by a processor, realizes the audio and video processing method as recited in the embodiment of the present disclosure.

Figure 10:
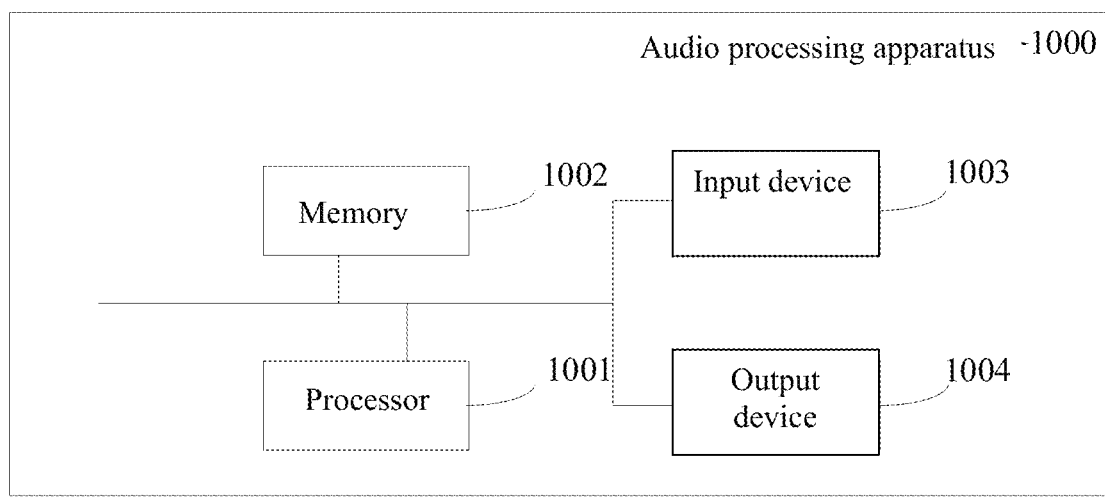
FIG. 10 is a schematic structural diagram of some embodiments of an audio and video processing apparatus provided by some embodiments of the present disclosure.

Besides, some embodiments of the present disclosure further provide an audio and video processing apparatus, as shown in FIG. 10, which can comprise:
a processor 1001, a memory 1002, an input device 1003 and an output device 1004. The number of processors 1001 in the audio and video processing apparatus can be one or more, and one processor is taken as an example in FIG. 10. In some embodiments of the present disclosure, the processor 1001, the memory 1002, the input device 1003 and the output device 1004 can be connected by a bus or other means, wherein, connection by a bus is taken as an example in FIG. 10.

The memory 1002 is configured to store software programs and modules, and the processor 1001 runs the software programs and modules stored in the memory 1002, thus realizing various functional applications and data processing of the audio and video processing apparatus. The memory 1002 can substantially comprise a storage program area and a storage data area, wherein the storage program area is configured to store an operating system, applications needed by at least one function, and the like. Further, the memory 1002 can comprises a high-speed random access memory, and can also comprise a non-volatile memory, such as at least one disk memory device, flash memory device, or other volatile solid-state memory devices. The input device 1003 is configured to receive input digital or character information and generate signal input related to user settings and function control of the audio and video processing apparatus.

In the embodiments, the processor 1001 loads executable files corresponding to the processes of one or more applications into the memory 1002 according to the following instruction, and the processor 1001 will run the applications stored in the memory 1002, thus realizing various functions of the above audio and video processing apparatus.

The present disclosure provides a computer program, comprising an instruction that, when executed by the processor, causes the processor to perform the audio and video processing method according to any one of the above embodiments.

It should be noted that in this context, relational terms such as "first" and "second" are only used to distinguish one entity or operation from another entity or operation, and do not necessarily require or imply that there is any such actual relationship or order between these entities or operations. Moreover, terms "comprising", "comprising" or any other variation thereof are intended to cover non-exclusive inclusion, so that a process, method, article or apparatus comprising a series of elements comprises not only those elements, but also other elements not explicitly listed or elements inherent to such process, method, article or apparatus. Without further restrictions, an element defined by the phrase "comprising one" does not exclude the existence of other identical elements in the process, method, article or apparatus comprising the element.

What has been described above is only specific embodiments of the present disclosure to enable those skilled in the art to understand or realize the present disclosure. Many modifications to these embodiments will be obvious to those skilled in the art, and the general principles defined herein can be implemented in other embodiments without departing from the spirit or scope of the present disclosure. Therefore, the present disclosure will not be limited to the embodiments described herein, but is to be accorded the widest scope consistent with the principles and novel features disclosed herein.

What is claimed is:
1. An audio and video processing method, comprising:
acquiring an audio corresponding to a target video, in response to a preset trigger operation on a video playing page corresponding to the target video, wherein the target video is played on the video playing page, and the target video is a video in a video information stream;

switching from the video playing page to an audio playing page, and playing the audio corresponding to the target video on the audio playing page, wherein the audio playing page is a different page from the video playing page;

presenting, in response to a trigger operation for a target identity icon on the audio playing page, a video of a user corresponding to the target identity icon on the audio playing page in a preset floating window mode, the target identity icon being a user identity icon corresponding to a comment on the audio playing page or a user identity icon corresponding to the audio currently played;

determining an audio playlist based on the video of the user corresponding to the target identity icon, in response to a trigger operation for a first video of the video of the user corresponding to the target identity icon, in the audio playlist, an audio corresponding to the first video being taken as an audio to be played at a first place in the audio playlist; and playing an audio on the audio playing page, based on the audio playlist.

2. The audio and video processing method according to claim 1, further comprising, before the playing the audio corresponding to the target video on the audio playing page:

acquiring current playing information of the target video, in response to a preset trigger operation on the video playing page corresponding to the target video, the current playing information comprising at least one of playing status information or playing progress information, wherein the playing the audio corresponding to the target video on the audio playing page, comprises:

playing the audio corresponding to the target video on the audio playing page, based on the current playing information of the target video.

3. The audio and video processing method according to claim 1, further comprising, after the playing the audio corresponding to the target video on the audio playing page:

acquiring an audio information stream in which the audio corresponding to the target video is comprised, in response to a preset first page sliding operation on the audio playing page; and playing an audio on the audio playing page, based on the audio information stream.

4. The audio and video processing method according to claim 1, further comprising, after the playing the audio corresponding to the target video on the audio playing page:

acquiring a first audio playlist of a user corresponding to the target video, in response to a preset second page sliding operation on the audio playing page, the first audio playlist comprising an audio corresponding to a video belonging to the user; and playing an audio on the audio playing page, based on the first audio playlist.

5. The audio and video processing method according to claim 1, further comprising, after the playing the audio corresponding to the target video on the audio playing page:

acquiring a video corresponding to the target audio, in response to a preset return operation on the audio playing page playing the target audio; and switching from the audio playing page to the video playing page, and playing the video corresponding to the target audio on the video playing page.

6. The audio and video processing method according to claim 1, further comprising, after the playing the audio corresponding to the target video on the audio playing page:

presenting, on the audio playing page, comment information corresponding to the audio currently played on the audio playing page in a preset scrolling mode, in response to a trigger operation for a preset first control on the audio playing page.

7. The audio and video processing method according to claim 6, wherein an audio cover image is presented on the preset first control, and the audio cover image is a preset frame image in the target video.

8. The audio and video processing method according to claim 1, further comprising, after the playing the audio corresponding to the target video on the audio playing page:

displaying a comment panel on the audio playing page, in response to a trigger operation for a preset comment control on the audio playing page.

9. The audio and video processing method according to claim 1, further comprising, after the playing the audio corresponding to the target video on the audio playing page:

performing a fast-forward playback or a fast-backward playback for the audio corresponding to the target video for a preset time, in response to a trigger operation for a fast-forward control or a fast-backward control on the audio playing page.

10. The audio and video processing method according to claim 1, further comprising, after the playing the audio corresponding to the target video on the audio playing page:

presenting a timing interface on the audio playing page, in response to a trigger operation for a timing control on the audio playing page; and determining timing information for the audio playing page, based on the timing interface, the timing information configured to timely close an application corresponding to the audio playing page.

11. A non-transitory computer-readable storage medium, in which an instruction is stored, which instruction, when run on a terminal device, causes the terminal device to realize an audio and video processing method comprising:

acquiring an audio corresponding to a target video, in response to a preset trigger operation on a video playing page corresponding to the target video, wherein the target video is played on the video playing page, and the target video is a video in a video information stream;

switching from the video playing page to an audio playing page, and playing the audio corresponding to the target video on the audio playing page, wherein the audio playing page is a different page from the video playing page;

presenting, in response to a trigger operation for a target identity icon on the audio playing page, a video of a user corresponding to the target identity icon on the audio playing page in a preset floating window mode, the target identity icon being a user identity icon corresponding to a comment on the audio playing page or a user identity icon corresponding to the audio currently played;

determining an audio playlist based on the video of the user corresponding to the target identity icon, in response to a trigger operation for a first video of the video of the user corresponding to the target identity icon, in the audio playlist, an audio corresponding to the first video being taken as an audio to be played at a first place in the audio playlist; and playing an audio on the audio playing page, based on the audio playlist.

12. An audio and video processing apparatus, comprising a memory, a processor, and a computer program stored in the memory and executable on the processor, and when the processor executes the computer program, the apparatus performs an audio and video processing method comprising:

acquiring an audio corresponding to a target video, in response to a preset trigger operation on a video playing page corresponding to the target video, wherein the target video is played on the video playing page, and the target video is a video in a video information stream;

switching from the video playing page to an audio playing page, and playing the audio corresponding to the target video on the audio playing page, wherein the audio playing page is a different page from the video playing page;

presenting, in response to a trigger operation for a target identity icon on the audio playing page, a video of a user corresponding to the target identity icon on the audio playing page in a preset floating window mode, the target identity icon being a user identity icon corresponding to a comment on the audio playing page or a user identity icon corresponding to the audio currently played;

determining an audio playlist based on the video of the user corresponding to the target identity icon, in response to a trigger operation for a first video of the video of the user corresponding to the target identity icon, in the audio playlist, an audio corresponding to the first video being taken as an audio to be played at a first place in the audio playlist; and playing an audio on the audio playing page, based on the audio playlist.

13. The audio and video processing apparatus according to claim 12, wherein the processor executes following steps:

acquiring current playing information of the target video, in response to a preset trigger operation on the video playing page corresponding to the target video, the current playing information comprising at least one of playing status information or playing progress information; and playing the audio corresponding to the target video on the audio playing page, based on the current playing information of the target video.

14. The audio and video processing apparatus according to claim 12, wherein the processor executes following steps, after the playing the audio corresponding to the target video on the audio playing page:

acquiring an audio information stream in which the audio corresponding to the target video is comprised, in response to a preset first page sliding operation on the audio playing page; and playing an audio on the audio playing page, based on the audio information stream.

15. The audio and video processing apparatus according to claim 12, wherein the processor executes following steps, after the playing the audio corresponding to the target video on the audio playing page:

acquiring a first audio playlist of a user corresponding to the target video, in response to a preset second page sliding operation on the audio playing page, the first audio playlist comprising an audio corresponding to a video belonging to the user; and playing an audio on the audio playing page, based on the first audio playlist.

16. The audio and video processing apparatus according to claim 12, wherein the processor executes following steps, after the playing the audio corresponding to the target video on the audio playing page:

acquiring a video corresponding to the target audio, in response to a preset return operation on the audio playing page playing the target audio; and switching from the audio playing page to the video playing page, and playing the video corresponding to the target audio on the video playing page.

17. The audio and video processing apparatus according to claim 12, wherein the processor executes a following step, after the playing the audio corresponding to the target video on the audio playing page:

presenting, on the audio playing page, comment information corresponding to the audio currently played on the audio playing page in a preset scrolling mode, in response to a trigger operation for a preset first control on the audio playing page.

18. The audio and video processing apparatus according to claim 17, wherein an audio cover image is presented on the preset first control, and the audio cover image is a preset frame image in the target video.

19. The audio and video processing apparatus according to claim 12, wherein the processor executes a following step, after the playing the audio corresponding to the target video on the audio playing page:

displaying a comment panel on the audio playing page, in response to a trigger operation for a preset comment control on the audio playing page.

\* \* \* \* \*